US012345810B2

(12) United States Patent
Savord

(10) Patent No.: US 12,345,810 B2
(45) Date of Patent: Jul. 1, 2025

(54) 1.X-DIMENSIONAL ULTRASOUND TRANSDUCER ARRAY WITH ELEVATION CONTROL FOR APERTURE AND ASSOCIATED DEVICES, SYSTEMS, AND METHODS

(71) Applicant: KONINKLIJKE PHILIPS N.V., Eindhoven (NL)

(72) Inventor: Bernard Joseph Savord, Andover, MA (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 122 days.

(21) Appl. No.: 18/028,250

(22) PCT Filed: Sep. 18, 2021

(86) PCT No.: PCT/EP2021/075734
§ 371 (c)(1),
(2) Date: Mar. 24, 2023

(87) PCT Pub. No.: WO2022/069264
PCT Pub. Date: Apr. 7, 2022

(65) Prior Publication Data
US 2023/0375701 A1     Nov. 23, 2023

Related U.S. Application Data

(60) Provisional application No. 63/084,728, filed on Sep. 29, 2020.

(51) Int. Cl.
*G01S 15/89*     (2006.01)
*G01S 7/52*     (2006.01)

(52) U.S. Cl.
CPC ...... *G01S 15/8915* (2013.01); *G01S 7/52033* (2013.01); *G01S 7/5208* (2013.01)

(58) Field of Classification Search
CPC . G01S 15/8915; G01S 7/52033; G01S 7/5208
See application file for complete search history.

(56) References Cited

U.S. PATENT DOCUMENTS 4,476,873 A * 10/1984 Sorenson ............. A61B 8/4245
600/447
4,489,729 A * 12/1984 Sorenson ............. A61B 8/4245
600/447

(Continued)

FOREIGN PATENT DOCUMENTS

| WO | 2018041636 A1 | 3/2018 |
| WO | 2019158363 A1 | 8/2019 |
| WO | 2019215115 A1 | 11/2019 |

OTHER PUBLICATIONS

International Search Report and Written Opinion for PCT/EP2021/075734; Mailing date: Dec. 14, 2021, 12 pages.

*Primary Examiner* — Dixomara Vargas

(57) ABSTRACT

An ultrasound imaging system includes an ultrasound probe. The ultrasound probe includes a housing and a transducer array with first, second, and third acoustic elements. The first acoustic element is arranged between the second and third acoustic elements in an elevation dimension. The first acoustic element generates a first analog ultrasound signal, and the second third acoustic elements are electrically coupled to generate a second analog ultrasound signal. The ultrasound probe includes a first amplifier in communication with the first acoustic element. The ultrasound probe includes second and third amplifiers in communication with the second and third acoustic elements. The first and second amplifiers apply gain to the first and second analog ultrasound signals, respectively, according to a first gain profile. The third amplifier applies gain only to the second analog ultrasound signal according to a second gain profile that is different than the first gain profile.

16 Claims, 7 Drawing Sheets

(56) References Cited

U.S. PATENT DOCUMENTS

| | | | | |
|---|---|---|---|---|
| 5,068,833 A | * | 11/1991 | Lipschutz | H01Q 3/28 |
| | | | | 367/900 |
| 5,301,168 A | | 4/1994 | Miller | |
| 5,740,806 A | | 4/1998 | Miller | |
| 2004/0000841 A1 | | 1/2004 | Phelps et al. | |
| 2005/0261589 A1 | * | 11/2005 | Daft | G01S 7/52023 |
| | | | | 600/459 |
| 2008/0045838 A1 | * | 2/2008 | Hyuga | G01S 15/8927 |
| | | | | 600/463 |
| 2018/0367111 A1 | | 12/2018 | Singh et al. | |
| 2019/0227165 A1 | | 7/2019 | Savord et al. | |
| 2020/0174108 A1 | * | 6/2020 | Rothwell | G01S 7/52053 |
| 2022/0317271 A1 | * | 10/2022 | Franza | B06B 1/0629 |

\* cited by examiner

1.X-DIMENSIONAL ULTRASOUND TRANSDUCER ARRAY WITH ELEVATION CONTROL FOR APERTURE AND ASSOCIATED DEVICES, SYSTEMS, AND METHODS

CROSS-REFERENCE TO PRIOR APPLICATIONS

This application is the U.S. National Phase application under 35 U.S.C. § 371 of International Application No. PCT/EP2021/075734, filed on Sep. 18, 2021, which claims the benefit of U.S. Provisional Patent Application No. 63/084,728, filed on Sep. 29, 2020. These applications are hereby incorporated by reference herein.

TECHNICAL FIELD

The present disclosure relates generally to ultrasound imaging using 1.X-dimensional transducer arrays. In particular, different gain profiles may be applied to elevational transducer elements to modify the elevational size of the aperture of 1.X-dimensional arrays and focus imaging beams at different depths.

BACKGROUND

Ultrasound imaging systems are often used for medical imaging. An ultrasound imaging system typically includes a transducer probe as well as a main processing system. The transducer probe may include an array of ultrasound transducer elements. The ultrasound transducer elements send acoustic waves through a patient's body and subsequently record echo signals as the acoustic waves are reflected back by the tissues and/or organs within the patient's body. The timing and/or strength of the echo signals may correspond to the size, shape, and mass of the tissues, organs, or other features of the patient. The tissues, organs, or other features of the patient may be displayed to a user of the ultrasound system.

Ultrasound imaging systems use various types of transducer arrays. For example, ultrasound systems may have one-dimensional arrays or two-dimensional matrix arrays. While a two-dimensional matrix array provides maximum ability to focus or steer an imaging beam, two-dimensional matrix arrays require many transducer elements and can be costly. 1.X-dimensional transducer arrays may require fewer transducer elements but still preserve some aspects of control in the elevational direction, including the ability to focus the ultrasound imaging beam at varying depths. However, to focus an ultrasound imaging beam with a 1.X-dimensional array often requires complex circuitry with many electrical components leading to increased cost of an ultrasound imaging system.

SUMMARY

Embodiments of the present disclosure are systems, devices, and methods for ultrasound imaging using a 1.X-dimensional transducer array. An ultrasound system may include a host, a probe, and a connecting cable. The ultrasound imaging probe may include a 1.X-dimensional transducer array. The transducer array may transmit ultrasound signals toward a region of a patient's anatomy and receive reflected waves to form an image. Elevational rows of ultrasound transducers positioned on either side of a center row of transducers may be used to focus the ultrasound imaging beam. As the imaging depth increases, or as the distance between the region to be imaged and the ultrasound probe increases, the gain of outer elevational transducers may be gradually increased. This increase in gain of outer elevational elements effectively increases the elevation size of the aperture of the transducer array and results in increased data quality for regions deeper in the anatomy.

Some embodiments of the present disclosure apply separate gain profiles to outer elevational elements and center elements to gradually increase the gain of the outer transducer elements. Other embodiments apply a common gain profile to all transducer elements and apply a weighting profile to the outer transducer elements to gradually increase the gain of the outer elements. Still other embodiments facilitate focusing of the imaging beam by converting received analog signals to digital signals and applying a delay to the outer and/or inner transducer elements. The disclosed embodiments provide increased signal and image quality at varying depths within a patient's anatomy while reducing required circuitry resulting in a simpler, more cost-effective ultrasound imaging probe.

In an exemplary aspect of the present disclosure, an ultrasound imaging system is provided. The ultrasound imaging system includes an ultrasound probe, comprising: a housing; a transducer array mechanically coupled to the housing, wherein the transducer array comprises a first acoustic element, a second acoustic element, and a third acoustic element, wherein the first acoustic element is arranged between the second acoustic element and the third acoustic element in an elevation dimension, wherein the first acoustic element is configured to generate a first analog ultrasound signal, and the second acoustic element and the third acoustic element are electrically coupled to generate a second analog ultrasound signal; a first amplifier disposed within the housing and in communication with the first acoustic element; and a second amplifier and a third amplifier disposed within the housing and in communication with the second acoustic element and the third acoustic element, wherein the first amplifier and the second amplifier are configured to apply gain to the first analog ultrasound signal and the second analog ultrasound signal, respectively, according to a first gain profile, and wherein the third amplifier is configured to apply gain only to the second analog ultrasound signal according to a second gain profile that is different than the first gain profile.

In some aspects, the transducer array comprises a 1.X-dimensional array. In some aspects, the transducer array comprises a first row of acoustic elements, a second row of acoustic elements, and a third row of acoustic elements, the first row of acoustic elements is arranged between the second row of acoustic elements and the third row of acoustic elements in the elevation dimension, the first row of acoustic elements comprises the first acoustic element, the second row of acoustic elements comprises the second acoustic element, and the third row of acoustic elements comprises the third acoustic element. In some aspects, the ultrasound probe further includes a first analog summation circuit in communication with the first amplifier and the third amplifier, wherein the first analog summation circuit is configured to combine the first analog ultrasound signal and the second analog ultrasound signal to generate a first analog output.

In some aspects, the ultrasound probe further comprises circuitry in communication with the first acoustic element, the second acoustic element, and the third acoustic element, the circuitry comprises the first amplifier, the second amplifier, and the third amplifier, the circuitry is in communication with a fourth acoustic element, a fifth acoustic element, and a sixth acoustic element, the fourth acoustic element is arranged between the fifth acoustic element and the sixth acoustic element in the elevation dimension, the first acoustic element, the second acoustic element, and the third acoustic element are arranged in a first column of the transducer array, the fourth acoustic element, the fifth acoustic element, and the sixth acoustic element are arranged in a second column of the transducer array, and the first column and the second column are spaced from one another in an azimuth dimension such that other columns of the transducer array are disposed between the first column and the second column.

In some aspects, the ultrasound probe further comprises a fourth amplifier disposed within the housing and in communication with the fourth acoustic element; a fifth amplifier and a sixth amplifier disposed within the housing and in communication with the fifth acoustic element and the sixth acoustic element; and a second analog summation circuit in communication with the fourth amplifier and the sixth amplifier, the fourth acoustic element is configured to generate a third analog ultrasound signal, and the fifth acoustic element and the sixth acoustic element are electrically coupled to generate a fourth analog ultrasound signal, the fourth amplifier and the fifth amplifier are configured apply gain to the third analog ultrasound signal and the fourth analog ultrasound signal, respectively, according to the first gain profile, the sixth amplifier is configured to apply gain only to the fourth analog ultrasound signal according to the second gain profile, and the second analog summation circuit is configured to combine the third analog ultrasound signal and the fourth analog ultrasound signal to generate a second analog output.

In some aspects, the ultrasound probe further comprises a multiplexor configured to translate an aperture of the transducer array in the azimuth dimension. In some aspects, the multiplexor is configured to select between the first analog output and the second analog output. In some aspects, the ultrasound probe further comprises: an analog-to-digital converter (ADC) in communication with the analog summation circuit, wherein the ADC is configured to receive the output of the analog summation circuit and to generate a digital ultrasound signal. In some aspects, the system further includes a host system spaced from the ultrasound probe and a cable extending the host system and the ultrasound probe, wherein the ultrasound probe is configured to transmit the digital ultrasound signal to the host system via the cable, and wherein the host system comprises a processor circuit configured to generate an ultrasound image based on the digital ultrasound signal and output the ultrasound image to a display in communication with the processor circuit. In some aspects, the third amplifier is configured to increase an elevation size of an aperture of the transducer array. In some aspects, the ultrasound probe further comprises: a digital adder; a first analog to digital converter (ADC) communicatively positioned between the first amplifier and the digital adder; and a second ADC communicatively positioned between the second amplifier and the digital adder. In some aspects, the third amplifier comprises a digital amplifier communicatively positioned between the second ADC and the digital adder. In some aspects, the ultrasound probe further comprises: a first digital delay communicatively positioned between the first ADC and the digital adder; and a second digital delay communicatively positioned between second ADC and the third amplifier. In some aspects, the ultrasound probe further comprises: a first clock control in communication with first ADC and the first digital delay; and a second clock control in communication with the second ADC and the second digital delay.

In an exemplary aspect of the present disclosure, an ultrasound imaging probe is provided. The ultrasound imaging probe includes a housing; a 1.X dimensional transducer array mechanically coupled to the housing, wherein the transducer array comprises a first row of acoustic elements, a second row of acoustic elements, and a third row of acoustic elements, wherein the first row of acoustic elements is arranged between the second row of acoustic elements and the third row of acoustic elements in an elevation dimension, wherein the second row of acoustic elements and the third row of acoustic elements are electrical coupled; a first amplifier, a second amplifier, and a third amplifier disposed within the housing; and an analog to digital converter (ADC) configured to generate a digital ultrasound signal such that the ultrasound imaging probe outputs the digital ultrasound signal, wherein the first amplifier is configured to apply gain to a first analog ultrasound signal associated with the first row of acoustic elements according to a first gain profile, wherein the second amplifier is configured to apply gain to a second analog ultrasound signal associated with the second row of acoustic elements and the third row of acoustic elements according to the first gain profile, wherein the third amplifier is configured to apply gain to only the second analog ultrasound signal according to a second gain profile different than the first gain profile such that an elevation size of an aperture of the transducer array increases, and wherein the ADC is configured to generate the digital ultrasound signal based on at least one of the first analog ultrasound signal or the second analog ultrasound signal.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
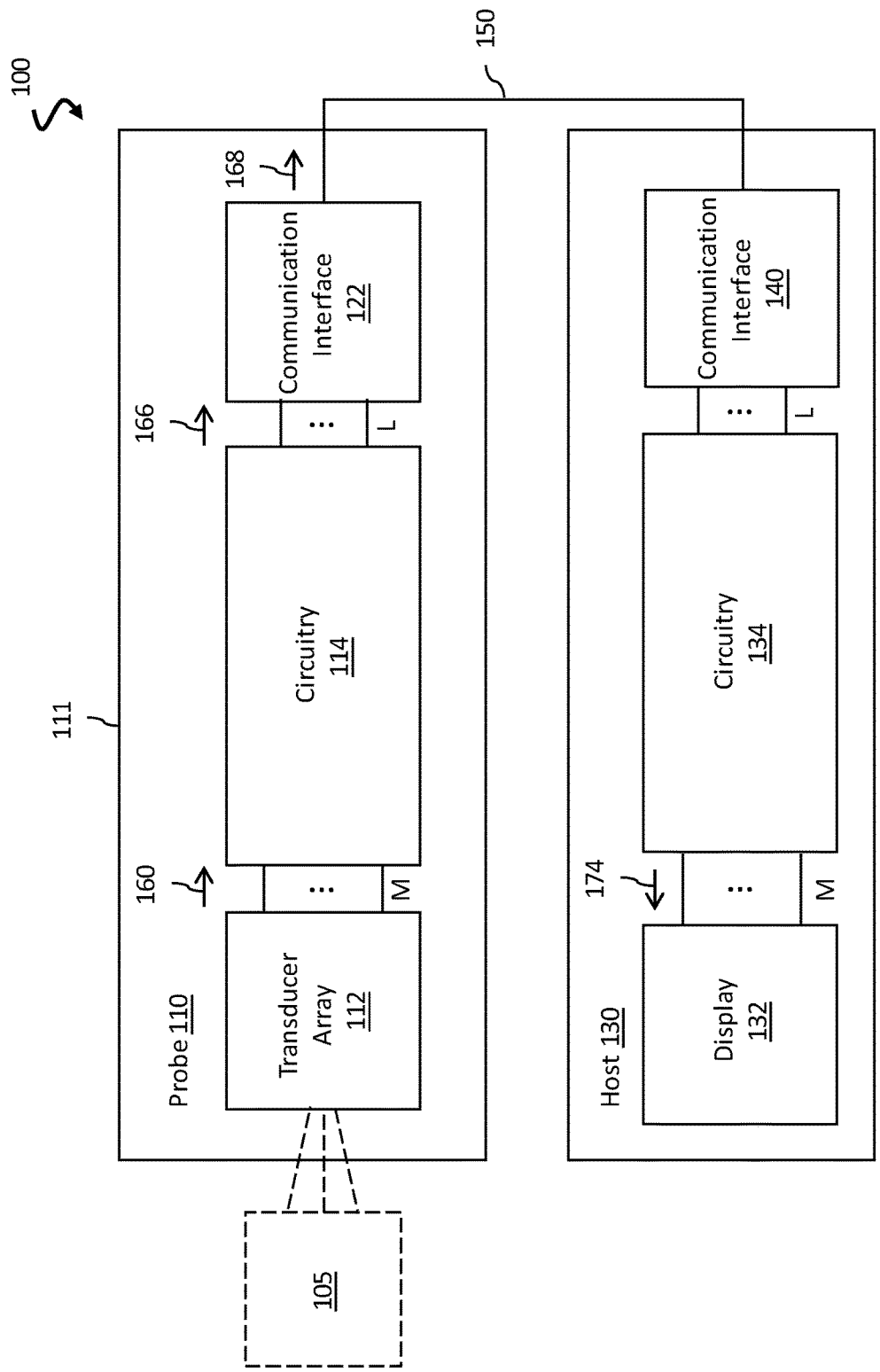
FIG. 1 is a schematic diagram of an ultrasound imaging system, according to aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic diagram of an ultrasound imaging system, according to aspects of the present disclosure. The system 100 is used for scanning a region, area, or volume of a patient's body. The system 100 includes an ultrasound imaging probe 110 in communication with a host 130 over a communication link 150. At a high level, the probe 110 emits ultrasound waves towards an anatomical object 105 (e.g., a patient's body) and receives ultrasound echoes that are reflected from the object 105. The probe 110 transmits electrical signals representative of the received echoes over the link 150 to the host 130 for processing and image display. The signals representative of the received echoes can transmitted over the link 150 in analog format, digital format, and/or both analog and digital formats. The probe 110 may be in any suitable form for imaging various body parts of a patient while positioned inside or outside of the patient's body. For example, the probe 110 may be in the form of a handheld ultrasound scanner, such as a transthoracic echocardiography (TTE) probe, or a patch-based ultrasound device. In some embodiments, the ultrasound probe is not handheld and is rather held in place via a strap, mechanical holder, and/or adhesive. In some embodiments, the probe 110 can be a catheter, a transesophageal echocardiography (TEE) probe, or other an endo-cavity or intraluminal probe. The probe 110 may include any of the components shown in FIG. 1. Any of the components of the probe 110 may be positioned or stored in a housing 111. When the probe 110 is a handheld probe, the housing 111 is configured to be grasped by the hand of a user.

The probe 110 can include a transducer array 112, circuitry 114, and a communication interface 140, all of which may be mechanically coupled to the housing of the probe 110. The transducer array 112 emits ultrasound signals towards the object 105 and receives echo signals reflected from the object 105 back to the transducer array 112. The transducer array 112 may include an array of acoustic elements. In an exemplary embodiment, the transducer array 112 is a 1.X-dimensional array, such as a 1.25D array or a 1.5D array. In other embodiments, the transducer array can be arranged in a one-dimensional (1D) array or in a two-dimensional (2D) array. The acoustic elements may be referred to as transducer elements. Each transducer element can emit ultrasound waves towards the object 105 and can receive echoes as the ultrasound waves are reflected back from the object 105. Each transducer element generates an analog electrical signal representative of the received ultrasound echoes. The transducer array 112 can include M transducer elements producing M analog ultrasound echo channel signals 160. In some embodiments, M can be about 2, 16, 64, 128, 192, 500, 1000, 5000, 9000, and/or other suitable values larger, smaller, or therebetween.

Circuitry 114 positioned within the probe 110 may be any of any suitable type and may serve several functions. For example, circuitry 114 may include resistors, capacitors, transistors, inductors, relays, clocks, timers, or any other suitable electrical component that may be integrated in an integrated circuit. In addition, circuitry 114 may be configured to support analog signals and/or digital signals transmitted to or from the transducer array 112 and/or the probe 110. In some embodiments, circuitry 114 may include analog frontends (AFEs), analog-to-digital converters (ADCs), multiplexers (MUXs), and encoders, among various other components. In some embodiments, the circuitry 114 can include hardware components, software components, and/or a combination of hardware components and software components.

The communication interface 122 is coupled to the circuitry 114 via L signal lines. In some embodiments, circuitry 114 may reduce the number of required lines from M signal lines to L signal lines. This may be accomplished by any suitable method using any suitable component. For example, MUXs, beamformers, or other components may be used to reduce the M signal lines from the transducer array 112 to L signal lines 166. In the embodiment of FIG. 1, L is less than M. The communication interface 122 is configured to transmit the L signals 166 to the host 130 via the communication link 150. The communication interface 122 may include a combination of hardware components and software components configured to generate signals 168 carrying the information from signals 166 for transmission over the communication link 150. In an exemplary embodiment, the signals 168 are digital signals such that digital ultrasound data is transmitted from the probe 110 to the host 130. The communication link 150 may include L data lanes for transferring the digital signals 168 to the host 130.

The host 130 may be any suitable computing and display device, such as a workstation, a personal computer (PC), a laptop, a tablet, a mobile phone, or a patient monitor. In some embodiments, the host 130 may be located on a moveable cart. At the host 130, the communication interface 140 may receive the digital signals 168 from the communication link 150. The communication interface 140 may include hardware components, software components, or a combination of hardware components and software components. The communication interface may be substantially similar to the communication interface 122 in the probe 110.

Circuitry 134 positioned within the host 130 may be of any suitable type and may serve any suitable function. For example, circuitry 134 may include resistors, capacitors, transistors, inductors, relays, clocks, timers, processing components, memory components, or any other suitable electrical component that may be integrated in an integrated circuit. In addition, circuitry 134 may be configured to support analog signals and/or digital signals transmitted to or from the probe 110. Circuitry 134 may be configured to process digital signals 168 received from the probe 110. For example, circuitry 134 may expand L signal lines received from the probe 110 to the original M signal lines corresponding to the specific transducer elements or groups or patches of transducer elements within the transducer array 112. Circuitry 134 may be configured to generate image signals 174 for display to a user and/or perform image processing and image analysis for various diagnostic modalities or ultrasound types (B mode, CW Doppler, etc.). Circuitry 134 may additionally include a central processing unit (CPU), a digital signal processor (DSP), a graphical processing unit (GPU), an application-specific integrated circuit (ASIC), a controller, a field-programmable gate array (FPGA), another hardware device, a firmware device, or any combination thereof. Circuitry 134 may also be implemented as a combination of computing devices, e.g., a combination of a DSP and a microprocessor, a GPU and a microprocessor, a plurality of microprocessors, one or more microprocessors in conjunction with a DSP core, or any other such configuration. Circuitry 134 can be configured to generate image signals 174 for display to a user and/or perform image processing and image analysis for various diagnostic modalities.

The display unit 132 is coupled to circuitry 134. The display unit 132 may include a monitor, a touch-screen, or any suitable display. The display unit 132 is configured to display images and/or diagnostic results processed by circuitry 134. The host 130 may further include a keyboard, a mouse, a touchscreen, or any suitable user-input components configured to receive user inputs for controlling the system 100.

While FIG. 1 is described in the context of transferring detected ultrasound echo data from the probe 110 to the host 130 for display, the host 130 can generate and transmit control signals for controlling operation the probe 110, for example, the excitations of the transducer elements at the transducer array 112.

Figure 2:
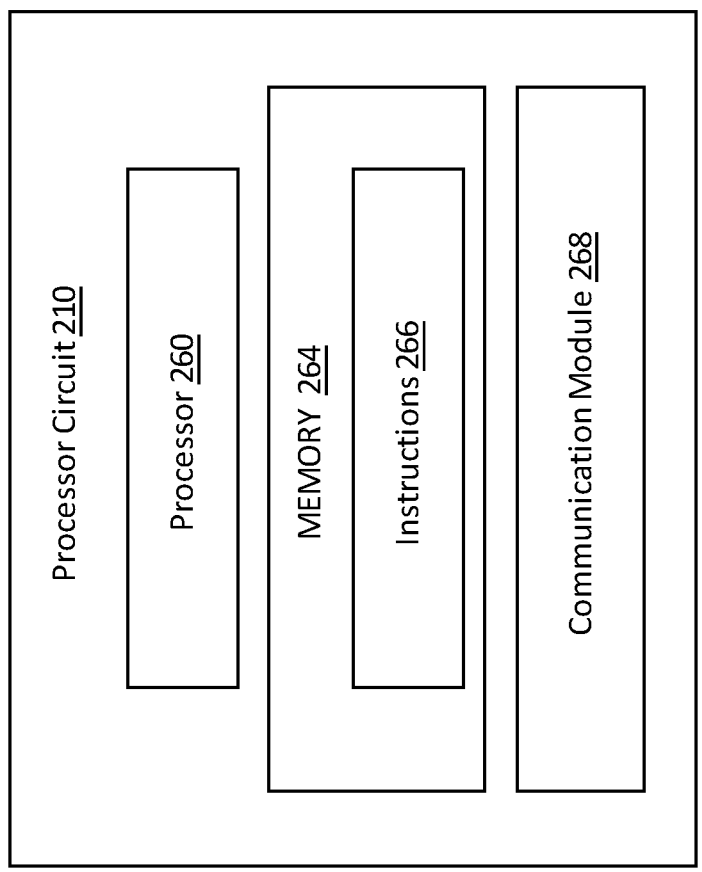
FIG. 2 is a schematic diagram of a processor circuit, according to aspects of the present disclosure.

FIG. 2 is a schematic diagram of a processor circuit, according to aspects of the present disclosure. The processor circuit 210 may be implemented in the probe 110, the host system 130 of FIG. 1, or any other suitable location. One or more processor circuits can be configured to carry out the operations described herein. The processor circuit 210 can be part of the circuitry 114 and/or circuitry 134, or may be separate circuitry. In an example, the processor circuit 210 may be in communication with the transducer array 112, circuitry 114, communication interface 122, communication interface 140, circuitry 134, and/or the display 132, as well as any other suitable component or circuit within ultrasound system 100. As shown, the processor circuit 210 may include a processor 260, a memory 264, and a communication module 268. These elements may be in direct or indirect communication with each other, for example via one or more buses.

The processor 260 may include a CPU, a GPU, a DSP, an application-specific integrated circuit (ASIC), a controller, an FPGA, another hardware device, a firmware device, or any combination thereof configured to perform the operations described herein. The processor 260 may also be implemented as a combination of computing devices, e.g., a combination of a DSP and a microprocessor, a plurality of microprocessors, one or more microprocessors in conjunction with a DSP core, or any other such configuration.

The memory 264 may include a cache memory (e.g., a cache memory of the processor 260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 264 includes a non-transitory computer-readable medium. The memory 264 may store instructions 266. The instructions 266 may include instructions that, when executed by the processor 760, cause the processor 260 to perform the operations described herein with reference to the probe 110 and/or the host 130 (FIG. 1). Instructions 266 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 268 can include any electronic circuitry and/or logic circuitry to facilitate direct or indirect communication of data between the processor circuit 710, the probe 110, and/or the display 132 and/or display 266. In that regard, the communication module 268 can be an input/output (I/O) device. In some instances, the communication module 268 facilitates direct or indirect communication between various elements of the processor circuit 210 and/or the probe 110 (FIG. 1) and/or the host 130 (FIG. 1).

Figure 3:
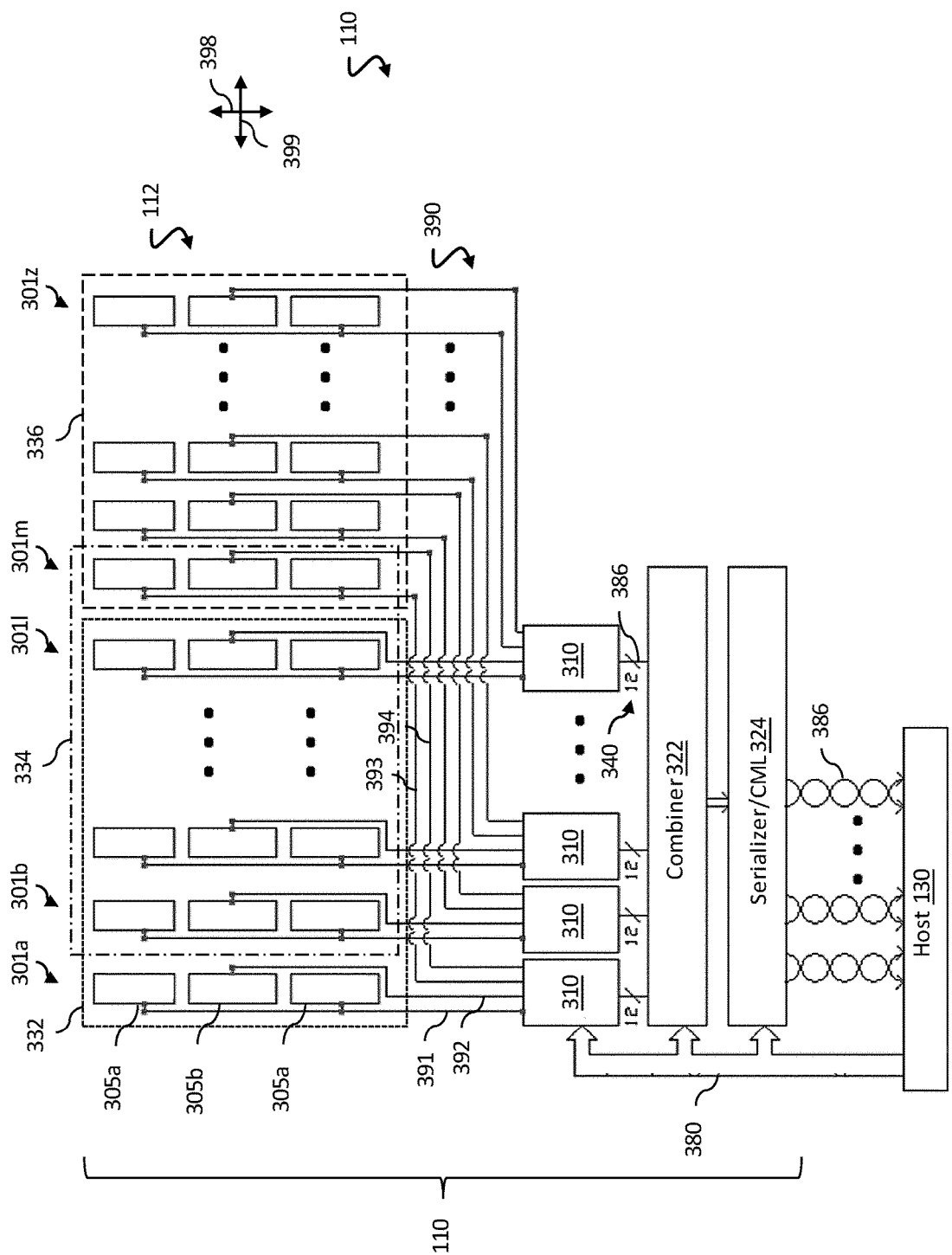
FIG. 3 is a schematic diagram illustrating example circuitry of an ultrasound imaging system with a 1.X-dimensional transducer array, according to aspects of the present disclosure.

FIG. 3 is a schematic diagram illustrating example circuitry of an ultrasound imaging system 100 with a 1.X-dimensional transducer array, according to aspects of the present disclosure. For example, FIG. 3 provides a more detailed view of circuitry within the probe 110. As shown in FIG. 3, the circuitry of the probe 110 may include the transducer array 112. The transducer array 112 may be in communication with a plurality of circuits or circuitry 310 via a number of conductors 390, including conductor 391, conductor 392, conductor 393, and conductor 394 among others. Any of the conductors 390 may additionally be referred to as conductive pathways or conductive traces. The probe 110 may additionally include a combiner 322, and a serializer and/or high speed current mode logic cable driver (CML) 324. As shown in FIG. 3, the host 130 may also be in communication with the probe 110 via a number of connecting conductors. Specifically, the connecting conductors may include a power and control conductors 380, and multiple transducer conductors 386. The connecting conductors, including the power and control conductors 380 and the transducer conductors 386 may together form a cable, may form multiple separate cables, or may be arranged in any other suitable configuration. Any of the components of the probe 110 may be positioned or stored in a housing.

In some embodiments, the transducer array 112 may be a 1.X-dimensional array. For example, the transducer array 112 may be a 1.25D array, 1.5D array, 1.75D array, or any suitable type of 1.X-dimensional array. In some aspects, a 1.25D array may include circuitry for controlling the aperture size in elevation. A 1.5D array may include additional circuitry configured to apply various delays to received signals from elements in the elevation dimension so as to focus these signals. In some embodiments, 1.25D and 1.5D arrays may assume symmetry where gain and delay are symmetric about the center of the elevation dimension. A 1.75D array may apply different delays to each of the outer elements in elevation and may be configured to steer the acoustic beam. 1.75D arrays may be symmetrical about a center row of elements or may be asymmetrical.

1.X dimensional arrays may refer to transducer arrays including a single row of inner transducer elements with additional rows of transducer elements on either side of the row of inner transducer elements. In some embodiments, these additional outer rows of transducer elements may be symmetrical, such that there is an equal number of rows of outer elements on both sides of the inner row of transducer elements. The outer rows of transducer elements may be used to provide elevation control or focusing control. In some embodiments, these additional outer rows of transducer elements may be electrically coupled together such that they are operated for transmit and receive in unison.

As an example, the transducer array 112 shown in FIG. 3 can be a 1.5-dimensional array. Axes 398 and 399 provide orientation directions of the transducer array 112 shown in FIG. 3. Specifically, the axis 398 illustrates the elevational or elevation direction and the axis 399 illustrates the azimuthal or lateral direction. The transducer array 112 includes one row of inner transducer elements 305b, and two rows of outer transducer elements 305a, one on either side of the inner row 305b in the elevational direction. The outer elements 305a may include twice as many transducer elements as the inner elements 305b and may be positioned such that one outer element 305a is positioned above each inner element 305b in the elevational direction and one outer element 305a is positioned below each inner element 305b in the elevational direction as shown in FIG. 3. The embodiment shown in FIG. 3 with one row of inner elements 305b and two rows of outer elements 305a may be referred to as three elements in elevation or three rows of elements in elevation. In some embodiments, the transducer array 112 can include only the three rows of elements shown in FIG. 3. In other embodiments, the transducer array 112 includes additional rows of elements. In other embodiments, the transducer array 112 may include 5 rows of transducer elements in elevation, 7 rows of transducer elements in elevation, 9 rows, or more. Some embodiments of the present disclosure include symmetrical rows of transducer elements such that odd numbers of rows of transducer elements are used. Similar to the transducer array 112 shown in FIG. 3, embodiments with additional outer rows of transducer elements may also couple outer rows such that outer rows are driven together. For example, two outer rows positioned directly next to and on either side of the center row may be coupled together, two more outer rows adjacent to and on either side of the first outer rows may also be coupled together, and so on. For example, the rows 305a are coupled together.

In other embodiments, the rows 305a may alternatively be only a single row of transducer elements positioned either above or below the transducer row 305b in the elevation direction 398. In such an embodiment, the transducer array 112 may include only two rows of transducer elements. In still other embodiments, the transducer array 112 may include an even number of rows of transducer element greater than two.

As will be discussed in more detail hereafter, different gain profiles may be applied to different rows of transducer elements for imaging at different depths within the patient anatomy. For example, in the embodiment shown in FIG. 3, only signals received from the inner row 305b may be used for imaging at locations near to the transducer array 112. Alternatively, when imaging at locations farther from the transducer array 112, the signals from the outer rows 305a may be gradually added to widen the aperture of the array in elevation. For simplicity's sake, description of various components within the probe 110 is given with reference to an odd number of rows wired in a symmetric manner (e.g., the three-row configuration of transducer elements shown in FIG. 3). However, it is fully contemplated that additional numbers of rows may be implemented according to the same principles presented.

In an embodiment with only two transducer rows, a row 305b and only one single row 305a positioned above or below the row 305b, signals received from the transducer elements of the row 305b may be used to for near field imaging and signals from both the row 305b and the row 305a may be used for far field imaging. In such an embodiment, the resulting near field and far field beams may be slightly mis-aligned but the misalignment may remain within a clinically acceptable amount. An embodiment in which only two rows of transducers are disposed within the transducer array 112 may reduce manufacturing cost by reducing the number of required transducer elements and does not require the electrical coupling between outer elements as shown in FIG. 3. The present disclosure could also be applied to such embodiments with the description regarding inner elements related to the row used for near field imaging and the description regarding outer elements related to the row that is additionally used for far field imaging.

A transducer row within the transducer array 112 may include any suitable number of transducer elements. For example, the row of transducer elements 305b and the two rows of transducer elements 305a all may each include 1, 2, 16, 50, 64, 75, 80, 90, 100 transducer elements, or any suitable number larger, smaller, or therebetween. Each row of transducer elements 305 may include an odd or an even number of transducer elements. In some embodiments, as shown in FIG. 3, the transducer array 112 may additionally be organized in columns 301. For example, a column of transducers 301a is at an azimuthal or lateral end of the transducer array 112 on the left side of FIG. 3. As shown in FIG. 3, the column 301a includes three transducer elements: one center transducer element 305b and two outer elements 305a. In an embodiment in which the transducer array 112 includes 5 rows of transducer elements, column 301a would include 5 transducer elements and so on. Adjacent and to the right of column 301a in the azimuthal direction, column 301b is shown. Column 301b also includes three transducer elements: one center element 305b and two outer elements 305a. Although not labelled, the transducer column adjacent and to the right of column 301b may be an additional column 301c and so on as indicated by the ellipses. Transducer columns 301 may continue in like manner until a column 301l. Columns 301a through 301l may represent a first portion of the transducer columns. For example, columns 301a through 301l may constitute half of the transducer elements in the transducer array 112. A second portion (e.g., a second half) of transducer columns 301 or transducer elements in the transducer array 112 are depicted to the right of column 301l. In various embodiments, configurations of transducer elements need not be limited to half of the array, but could be divided into sections or groups corresponding to one third, one fourth, two thirds, or any other partial fraction or suitable arrangement or configuration. Column 301m may represent the first transducer column 301 corresponding to the second portion of transducer columns 301. Adjacent and to the right of column 301m may be an additional column 301n followed by column 301o, and so on as indicated by the second set of ellipses. Such transducer elements may therefore continue until transducer column 301z at the rightmost end of the transducer array 112. Although numerals 301a through 301z have been used to indicate the columns of transducer elements 305 shown in FIG. 3, the transducer array 112 shown in FIG. 3 need not contain 26 columns of transducer elements 305. Rather, and as previously stated, the transducer array 112 can include any suitable number of rows and/or columns.

In some embodiments, an ultrasound image is generated from a series of acoustic lines or A-lines, with each line formed by a set of array elements translating across the aperture. For example, the first line may use a set of elements 332, the second using a set of elements 334, and so on with the last using a set 336.

During an ultrasound examination, the ultrasound imaging system 100 may designate a set of the transducer elements 305 to transmit ultrasound signals such that ultrasound energy propagates into an anatomy of a patient. The ultrasound imaging system 100 may further specify a set of transducer elements 305 to receive reflected waves. In some embodiments, the ultrasound transducers 305 selected to transmit ultrasound signals may be the same transducers used to receive reflected waves. In other embodiments, the ultrasound transducer elements 305 used to transmit ultrasound signals are different elements from those that receive. For example, in some embodiments, the ultrasound imaging system may select half of the ultrasound transducer elements 305 to transmit ultrasound signals into a patient's anatomy. As shown in FIG. 3 by boxes 332, 334, and 336, these elements selected for signal transmission may be any transducer elements. In some embodiments, the transducer elements may all be adjacent to one another. For example, box 332 of FIG. 3 indicates that the transducer elements 305 of columns 301a to 301l are selected by the ultrasound imaging system 100 to transmit ultrasound signals into an anatomy and form the aperture of the transducer array 112. The ultrasound imaging system 100 may shift the aperture, through adjustments in the circuitry of analog processors 310 as will be discussed later, such that the aperture is defined by columns 301b through 301m as shown by box 334. The aperture can be further shifted to include columns 301c through 301n, columns 301d through 301o, and so on, until, as shown by box 336, the aperture can be configured as columns 301m through 301z. In some embodiments, the transducer elements 305 selected to transmit ultrasound signals need not be directly adjacent to one another but may be spaced by one or more transducer elements 305 not used to transmit ultrasound signals. As the boxes 332, 334, and 336 identify elements of the transducer array 112 which together form an aperture, the boxes 332, 334, and 336 may additionally be referred to as apertures.

As shown in FIG. 3, the transducer elements of the transducer array 112 are in communication with a plurality of circuits 310 via multiple conductors 390. The conductors 390 may electrically couple the transducer elements 305 of the transducer array 112 to the circuits 310. The conductors 390 may be of any suitable form or type. In some embodiments, the conductors 390 may include conductive pathways or conductive traces positioned on a printed circuit board (PCB), a flexible or inflexible substrate, or in any other suitable configuration. As shown in FIG. 3, each circuit 310 is in communication with six transducer elements 305 via four conductors 390. Specifically, as shown in FIG. 3, the outer transducer elements 305a of column 301a may be electrically coupled to one another and a circuit 310 via conductor 391. The inner element 305b may be in communication with the same circuit 310 via conductor 392. The outer elements 305a of column 301m may be coupled to one another and the same circuit 310 via conductor 393. And finally, the inner element 305b of column 301m may be in communication with the same circuit 310 via conductor 394. The next circuit 310 may be in communication with the inner elements 305b and outer elements 305a of columns 301b and 301n in a similar manner. The next circuit 310 may be in communication with the elements of columns 301c and 301o in a similar manner and so on such that all transducer elements 305 are in communication with a respective circuit 310.

In other embodiments, a circuit 310 may be in communication with more or fewer transducer elements 305. For example, in an embodiment with five transducer rows, a circuit 310 may still be in communication with four transducer columns 301 as described, but each column may include five transducer elements. In such an embodiment, the outermost elements may be coupled together and to an analog processor 310 via one conductor 390, an additional conductor 390 may couple the elements between the outermost elements and the innermost element and to the same circuit 310, and an additional conductor 390 may provide communication between the innermost element and the circuit 310. In such an embodiment, rather than four conductors 390 in communication with the circuit 310, six such conductors 390 may be in communication with the circuit 310. Additional rows of transducer elements 305 would require additional conductors 390 as can be extrapolated. In addition, other embodiments involve one or more circuits 310 in communication with more than four transducer columns 301. These embodiments would require additional changes to the circuitry of analog processors 310 according to the embodiments described as will be outlined and discussed hereafter.

As described in more detail herein, the circuits 310 can include an analog to digital converter (ADC) such that the output of the circuits 310 is digital data or a bitstream. As shown by numerals 340, in some embodiments, the output of the circuits 310 may be a 12-bit output. However, the output of the circuits 310 may have any suitable bitrate (e.g., 4-bit, 8-bit, 16-bit, 24-bit, 32-bit, 64-bit, or any suitable number less than, greater than, or between those listed).

The circuits 310 may be in communication with a combiner 322. The combiner 322 is representative of circuitry that can reduce the total signal lines received from the circuits 310 and reduce the number of required signal lines for transmitting data to the host 130. The combiner 322 may reduce the number of signal lines by any suitable method. In some embodiments, the combiner 322 may include a summing node. The combiner 322, as well as any other suitable component or circuitry within the system 100 may include features similar to those described in U.S. application Ser. No. 16/329,433, titled "ULTRASOUND PROBE WITH MULTILINE DIGITAL MICROBEAMFORMER," and filed Feb. 28, 2019 and/or U.S. Provisional Application No. 62/631,549, titled "DIGITAL ULTRASOUND CABLE AND ASSOCIATED DEVICES, SYSTEMS, AND METHODS," and filed Feb. 16, 2018, both of which are hereby incorporated by reference in their entirety. In some embodiments, the combiner 322 may be a multiplexor that multiplexes data received from the circuits 310 into high-speed serial links and then send the data to the host 130 to be processed. In some embodiments, the combiner 322 may be a digital beamformer that performs a second stage of beamforming (delaying and summing of signals) after the first stage of beamforming is completed by an optional analog beamformer.

The combiner 322 may be in communication with the serializer and high speed current mode logic (CML) 324. The serializer/CML 324 may rearrange lines received from the combiner 322 and/or the circuits 310 into a high rate serial data stream. In some embodiments, the serializer/CML 324 may run at a higher data rate than other circuitry within the probe 110. For example, the serial data stream may run at 2.4 Ghz, whereas other circuitry within the ultrasound signal path may run at 20 MHz. The serializer/CML 324 may operate in a similar manner to the serializer disclosed in U.S. Provisional Application No. 62/631,549, titled "DIGITAL ULTRASOUND CABLE AND ASSOCIATED DEVICES, SYSTEMS, AND METHODS," and filed Feb. 16, 2018, which is hereby incorporated by reference in its entirety. Accordingly, in one of the signals paths of the probe 110, digital ultrasound data (e.g., B-mode data) can be transmitted from the probe 110 to the host 130 via the conductors 386. The conductors 386 may be a twisted pair of conductors or any other suitable form of conductors.

As previously mentioned, the probe 110 may be in communication with the host 130 via a communication interface or link 150 of FIG. 1. The link 150 may have any suitable number or types of conductors but may include the power and/or control conductors(s) 380 and one or more transducer conductors 386.

The power and/or control communication line(s) 380 may include one or multiple signal and/or power lines including conductors, twisted pairs, or any other suitable means of transferring data, signals, or power. For example, the communication line(s) 380 may include a conductor dedicated to providing control signals or other data from the host 130 to the probe 110. The conductors 380 may further include conductors that provide necessary power from the host 130 to components within the probe 110. The signal conductors may be in communication with a controller or any other suitable component within the host 130 and may provide signals for controlling clocks mentioned previously, switches, pulsers, the transducer array 112, the circuits 310, the combiner 322, the serializer/CML 324, and/or any other component within the probe 110. In some embodiments, the signal carrying conductor(s) of conductors 380 may be a twisted pair. In other embodiments, they may be a single conductor or any other suitable means of transmitting data signals. In some embodiments data transmitted via the conductors 380 may be 800 Mbs data, or data of any suitable frequency or type. The conductors 380 may further include a power line which may be in communication with a power supply within the host 130 or at any suitable location. The conductors 380 may provide DC or AC electrical signal to various components within the probe 110.

Further connecting the probe 110 and the host 130 may be multiple signal lines 386. The transducer lines or conductors 386 may correspond to a reduced number of signal lines output from the serializer/CML 324. In some embodiments, the transducer lines 386 may include only a single signal line. In other embodiments, the transducer lines 386 may include multiple signal lines. In some embodiments, the transducer lines 386 may be twisted pairs. In other embodiments, they may be single conductors, coaxial conductors, or any other suitable communication pathway for transmitting data signals. In addition, in some embodiments, the transducer conductors 386 may carry analog signals. In other embodiments, the conductors 386 may carry digital signals. In some embodiments, the signals may be carried over an optical link. In some embodiments, the signals may be carried wirelessly.

The conductors 380 and the transducer lines 386 may together form one connecting cable similar to the connecting cable 150 described with reference to FIG. 1. Specifically, the conductors 380 and the transducer lines 386 may be wrapped together with a cable shielding. The conductors 380, the transducer conductors 386, and any corresponding conductors enclosed together may be of any suitable length and/or may be a flexible elongate member. For example, the conductors 380, the transducer lines 386, and all associated conductors may be 1 meter, 2 meters, 3 meters in length, or other suitable values, both larger, smaller, or therebetween. In other embodiments, the conductors 380 and the transducer lines 386 may form separate connecting cables of the same or varying lengths.

The host 130 depicted in FIG. 3 and previously described with reference to FIG. 1 may include any suitable circuitry or may be of any suitable form. For example, the host 130 may include circuits such as integrated circuits, field-programmable gate arrays (FPGA's), processors, mixers, power supplies, controllers, filters, op-amps, or any other suitable circuitry configured to perform various functions related to beamforming, filtering, processing, ultrasound image generation, and/or displaying ultrasound images or data.

Figure 4:
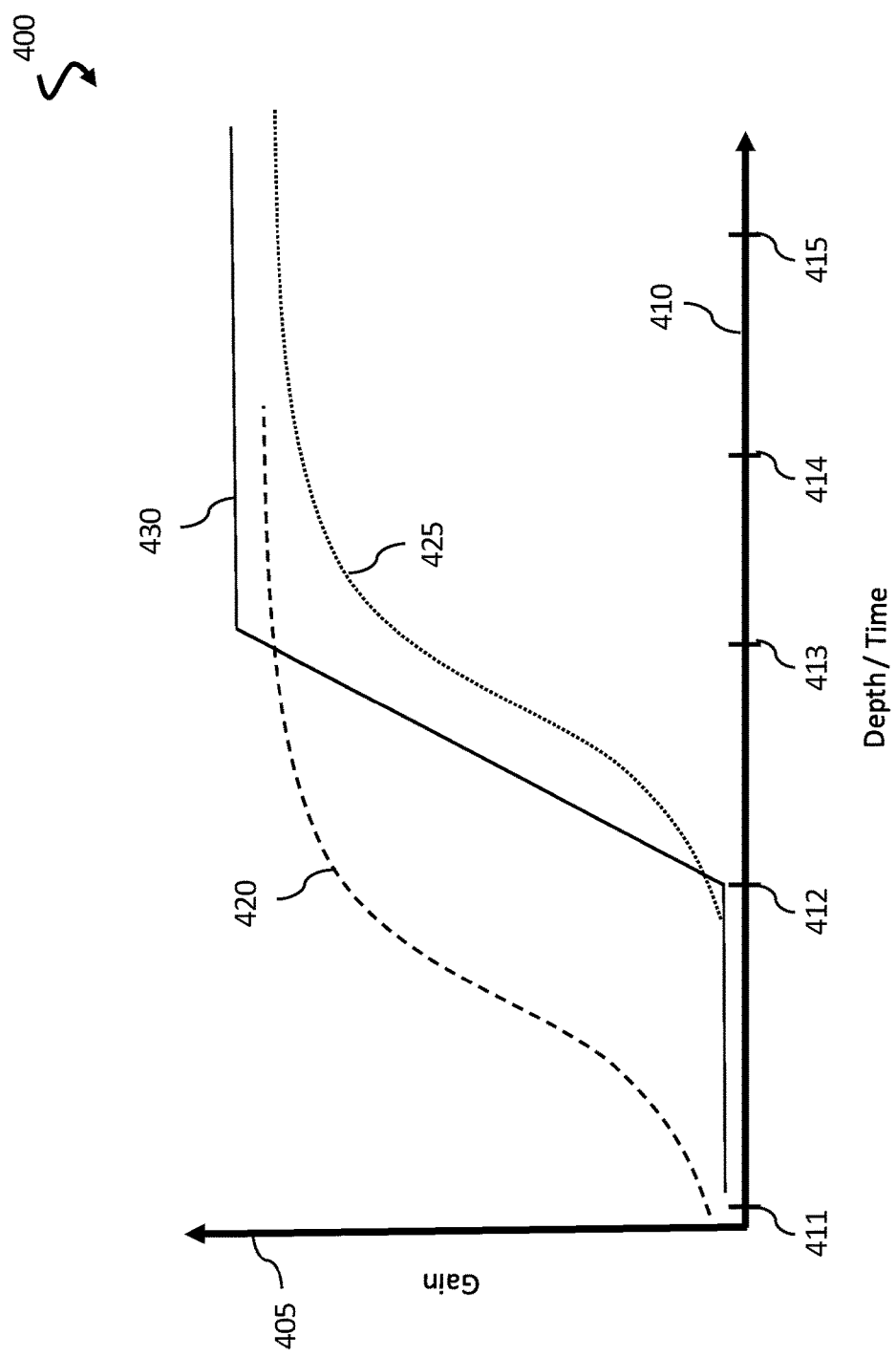
FIG. 4 is a plot illustrating example gain profiles applied to electrical signals generated by the transducer elements of a transducer array, according to aspects of the present disclosure.

FIG. 4 is a plot 400 illustrating example gain profiles applied to electrical signals generated by the transducer elements 305 of the transducer array 112, according to aspects of the present disclosure. The gain profiles depicted in plot 400 may be applied to the signals received from the various transducer elements 305 improving image or data quality corresponding to structures within an anatomy at various locations or depths with relation to the probe 110. Components shown in FIG. 3 may be communicatively and/or electrically positioned on signal paths, signal pathways, electrical paths, electrical pathways, or any other suitable terms.

The plot 400 includes a vertical axis 405 and a horizontal axis 410. Five locations, 411, 412, 413, 414, and 415 are included along the horizontal axis 410. The plot 400 further includes an inner element gain profile 420, an outer element gain profile 425, and a weighted gain profile 430.

The vertical axis 405, as labelled in FIG. 4, corresponds to the gain applied to electrical signals generated by one or more transducer elements 305 within the transducer array 112. A point within the plot 400 at a lower position along the vertical axis 405 corresponds to a lower gain value applied to the electrical signals. By contrast, a point corresponding to a higher location along the vertical axis 405 corresponds to a higher gain value applied to the electrical signals. The ratio of gain between low gain and high gain may be in the range of 10 dB to 60 dB or any other suitable range. For example, low gain may be −20 dB and high gain may be +20 dB.

The horizontal axis 410, as labelled in FIG. 4, corresponds to the depth of an anatomical object within an anatomy. In some cases, the depth of an anatomical object may correspond to the distance of the object from the transducer array 112. This depth or distance may, in some applications, be determined by measuring the amount of time from when ultrasound energy is emitted from the probe 110 to the reception of reflected waves or echoes at the probe 110. In such an application, the depth of an anatomical object measured may also be referred to in terms of, or in units of, time. FIG. 4 labels the horizontal axis 410 both as a measurement of depth and/or time. A point to the left of the plot 400 or a lower value along the horizontal axis 410 corresponds to a shallower depth, or a smaller distance from an anatomical object to the transducer array 112. For example, the time between transmission of an ultrasound signal and reception of a reflection is shorter for anatomy that is closer to the array 112 and less deep within the patient body. By contrast, a point to the right of the plot 400, or a higher value along the horizontal axis 410, corresponds to a deeper depth. For example, the time between transmission of an ultrasound signal and reception of a reflection is greater for anatomy that is farther away from the array 112 and more deep within the patient body. The locations 411, 412, 413, 414, 415 designate various depths or times in relation to the gain profiles 420, 425, and/or 430. In an example, the location 411 may correspond to 0 cM or 0 uS, the location 412 may correspond to 2 cM or 26 uS, the location 413 may correspond to 3 cM or 39 uS, the location 414 may correspond to 5 cM or 65 uS, and the location 415 may correspond to 30 cM or 390 uS. In other examples, the locations 411, 412, 413, 414, and 415 may correspond to any suitable depth or time measurement appropriate for the particular application.

The gain profiles 420, 425, and 430 illustrate how the gain applied to signals received from the outer elements 305a may be increased as depth or time increases effectively increasing the elevational size of the aperture. This increase in size of the aperture increases the magnitude of the received signals accounting for increased attenuation associated with increased depth resulting in better image quality in the far field. The gain profiles 420 and 425 together are associated with one method of increasing the elevational size of the aperture. The gain profiles 420 and 430 together are associated with another method of increasing elevational width of the aperture. In the near field of the image, a small aperture is used to produce an acoustic beam with a small width in elevation producing good detail and contrast resolution. However, this small aperture has insufficient energy to see deep within the body. To achieve the desired penetration in the far field, all the elements in the elevation aperture are used.

In some embodiments, the gain profiles 420, 425 can be used respectively to apply separate gain profiles for electrical signals of the inner elements 305b and outer elements 305a. The gain profile 420 shown in the plot 400 may represent a gain profile applied to inner elements 305b within the transducer array 112. At a point 411 along the horizontal depth/time axis 410 representing a location close to the transducer array 112, the gain applied to signals received from the inner elements 305b is low or of reduced amplitude. The gain applied to signals received from the outer elements 305a as shown by the gain profile 425 may, at location 411, be zero because the outer elements 305a may not be needed to receive echoes from a shallow location 411.

As the depth and/or time increases from point 411 to point 412 along the horizontal depth/time axis 410, the gain applied to signals received from the inner elements 305b gradually increases as shown by the gain profile 420 shown in FIG. 4. At a point between points 411 and 412, the gain applied to signals received from the outer elements 305a may remain zero. Between points 411 and 412, therefore, the elevational size of the aperture remains unchanged, but the gain applied to the electrical signals generated by the inner elements 305b increases to account for attenuation caused by ultrasound waves travelling a greater distance through the medium of a patient's anatomy.

At the point 412, as the gain profile 420 applied to inner elements 305b approaches a maximum, a small amount of gain is applied to signals received from the outer elements 305a as shown by the gain profile 425. At the point 412, the gain applied to signals from the inner elements 305b may be significantly greater than the gain applied to signals from the outer elements 305a as illustrated in the plot 400. The reduced gain applied to signals from the outer elements 305a may serve to gradually expand in elevation the aperture of the transducer array 112. The gain applied to signals from the outer elements 305a increases the effect of the echo signals received by the outer elements 305a on the ultrasound data, which corresponds to the emitted ultrasound imaging beam propagating deeper and wider into the anatomy.

At the point 414, the gain profile 420 applied to signals received from the inner elements 305b may be substantially at a maximum. In addition, as shown by the gain profile 425, the gain applied to signals received from the outer elements 305a may be significantly increased which in turn increases the elevational width of the aperture. This widening of the aperture may subsequently account for attenuation caused by ultrasound echoes travelling through the anatomy from a location of increased depth and enhance the quality of received data or constructed ultrasound images. At the point 415, both the gain profile 420 and the gain profile 425 applied to the inner elements 305b and the outer elements 305a respectively may be at a maximum.

The plot 400 additionally illustrates an alternative method of implementing separate gain profiles to signals received from the inner elements 305b and signals received from the outer elements 305a such that the elevation dimension of the aperture may be increased with depth or time. In some embodiments, and as will be discussed in more detail with reference to FIG. 6, an identical gain profile may be applied to both signals received from the inner elements 305b and signals received from the outer elements 305a. This gain profile may be of similar characteristics as the gain profile 420 shown in FIG. 4 or may differ. For example, the gain profile applied to both the inner elements 305b and the outer elements 305a may increase the gain with depth to account for attenuation from travelling deeper through the patient's anatomy. Rather than applying a separate gain profile to signals received from the outer elements 305a to increase the elevational width of the aperture with depth, a gain profile 430 may be additionally applied to the outer elements 305a such that at a small depth where an imaged anatomical object is positioned close to the transducer array 112, there is effectively no influence from the signals received from the outer elements 305a. For example, when the signals from inner elements 305b with the signals from outer elements 305a, at shallower depths, the signal component received from the inner elements 305b contributes significantly more to the summed signal than the signal component from the outer elements 305a. As depth increases, however, as shown by the gain profile 430, the outer elements 305a are gradually engaged allowing the common gain profile similar to the gain profile 420 to be fully applied. This gradually increases the elevational width of the aperture. As shown in FIG. 4, at all points of depth to the left of point 412, the gain profile 430 may suppress all gain applied to signals from the outer elements 430. Between points 412 and 413, however, the gain profile 430 may gradually allow increasing gain to signals from the outer elements 305a thus increasing the elevational dimension of the aperture. At all points to the right of point 413, the gain profile 430 may allow full gain to the outer elements 305a such that the elevational width of the aperture is at a maximum. The gain profile 430 may additionally be referred to as a weighting profile because it is selectively applied to the electrical signals generated by the outer elements 305a so that the effect of these electrical signals changes based on the profile 430.

It is noted that the gain profiles disclosed in FIG. 4 and described herein are merely example gain profiles and any number of different gain profiles may be generated and applied to the inner elements 305b and/or the outer elements 305a. For example, various gain profiles may begin a gradual gain increase to transducer elements sooner or beginning at a closer distance of an anatomical object to the transducer array 112. In other embodiments, the gain may begin increasing at a greater depth. In still other embodiments, the rate of increase of gain for each of the disclosed gain profiles may be greater or less or may involve different, varying, or inconsistent rates of increasing gain as depth increases along the horizontal axis 410.

Figure 5:
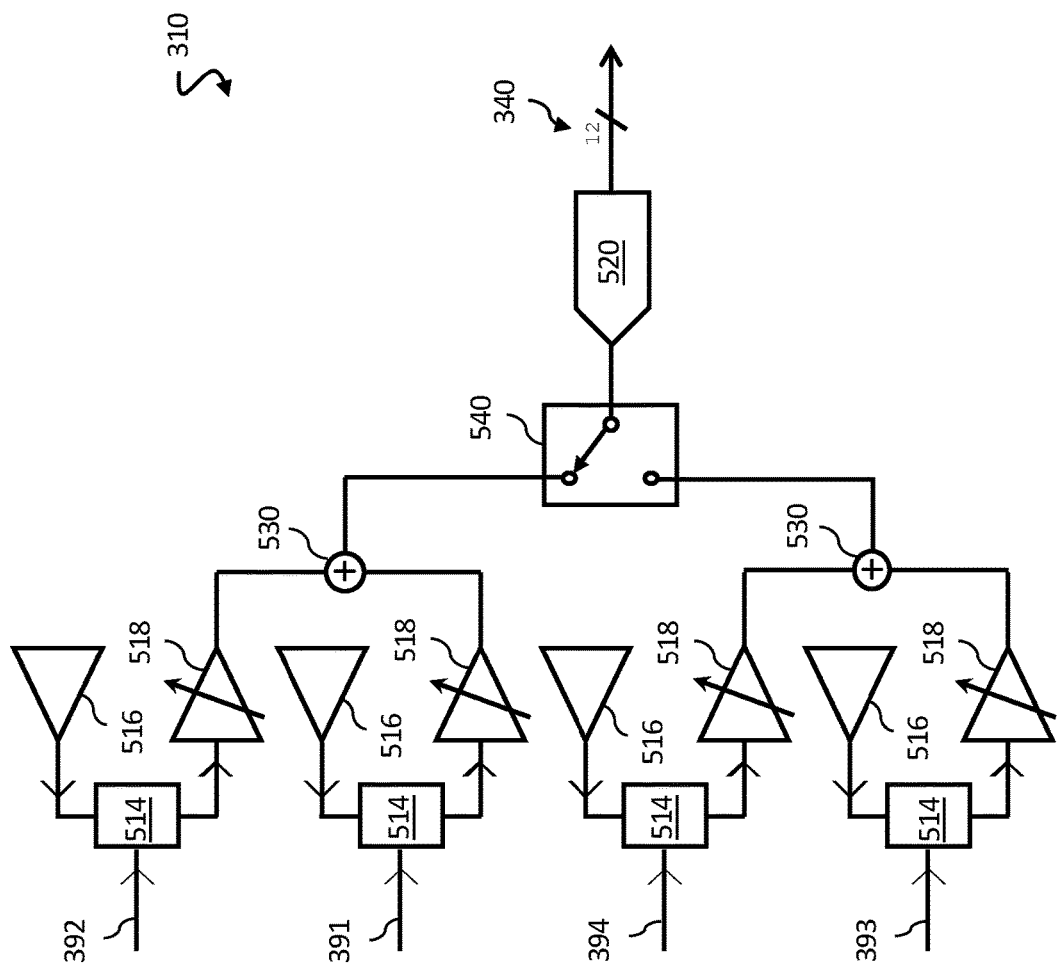
FIG. 5 is a schematic diagram illustrating example circuitry in communication with the transducer array, according to aspects of the present disclosure.

FIG. 5 is a schematic diagram illustrating example circuitry in communication with the transducer array 112, according to aspects of the present disclosure. FIG. 5 provides a more detailed view of one embodiment of the circuitry within one of the circuits 310.

The circuit 310 depicted in FIG. 5 may include four input conductors including conductors 391, 392, 393, and 394. Each of these four conductors may be coupled to a transmit receive switch (T/R switch) 514. Each T/R switch 514 may be additionally coupled to a pulser 516 and a preamp 518. Preamps 518 may be coupled to a summation component 530. Each summation component 530 may be coupled to an aperture translation multiplexor (MUX) 540 which may be coupled to an analog-to-digital converter 520. The MUX 540 can operate as a switch. In some embodiments, the MUX 540 can be a switch. The ADC 520 can be a low power ADC in some embodiments.

Conductor 392 shown in FIG. 5 connects the inner element 305b of column 301a (FIG. 3) to a T/R switch 514. Similarly, conductor 391 connects the outer elements 305a of column 301a to an additional T/R switch 514, conductor 394 connects the inner element 305b of column 301m to a T/R switch, and connector 393 connects the outer elements 305a of column 301m to a final T/R switch 514 shown in FIG. 5.

T/R switches 514 may be configured to switch between transmit and receive signal paths. For example, in a transmit position, the T/R switch 514 may receive a signal from the pulser 516 and subsequently transmit the signal to the transducer array 112 to energize the array to emit ultrasound energy. The pulsers 516 may also be referred to as transmit pulsers. The pulsers 516 may receive a transmit signal generated by the host 130. The pulsers 516 may be in communication with the host 130 via conductors 380. For example, the pulsers 516 may be in communication with the host via an 800 Mbs data conductor or any other suitable conductor or cable. In other embodiments, the pulsers 516 may also be configured to output electrical excitation pulses timed to excite the elements of the transducer array 112 to produce an acoustic transmit wave-front. The pulser circuitry may be located within the transducer housing.

In receive position, the T/R switch 514 may receive signals corresponding to reflected waves received by the transducer array 112 and transmit them to the preamp 518. T/R switches 514 may additionally be in communication with the host 130 via an 800 Mbs data line or any suitable conductor cable and may receive instructions regarding switching between transmit and receive signal paths. This communication cable may be included in the communication cable or link 150 of FIG. 1 and/or cable 380 of FIG. 3.

The preamplifiers 518 may be in communication with the output of the T/R switches 514 as shown in FIG. 5 and may be in communication with the elements of the transducer array 112 via the T/R switches 514. Specifically, when a T/R switch 514 is set in a receiving configuration by the ultrasound system 100, received signals corresponding to reflected waves may be transmitted to a connected preamp 518 through the T/R switch 514. In some embodiments, the number of pulsers 516 may be equal to the number of preamps 518 and the number of T/R switches 514. For example, each T/R switch 514 may be configured to receive data from one pulser 516 and transmit data from the transducer array 112 to one preamp 518. The preamps 518 may amplify signals received from the T/R switches 514 so as to improve the quality of received signals by, for example, reducing a noise floor. The outputs of the preamplifiers 518 may additionally be in communication with the summation components 530.

In addition to amplifying signals received from the outputs of the T/R switches 514, the preamps 518 may also implement the gain profiles 420 or 425 discussed with reference to FIG. 4. For example, the preamps 518 in communication with conductors 392 and 394 receiving signals from the inner transducer elements 305b may implement the gain profile 420 to received signals. By contrast, the preamps 518 in communication with the conductors 391 and 393 receiving signals from the outer elements 305a may implement the gain profile 425 to received signals.

Various methods of implementing the gain profiles 420 and 425 may be employed. In some embodiments, a programmable resistor may be implemented in communication with the preamps 518 in communication with the conductors 392 and 394 corresponding to the inner elements 305b. A separate programmable resistor may then also be implemented in communication with the preamps 518 in communication with the conductors 391 and 393 corresponding to the outer elements 305a. The programmable resistors may include a bank of resistors controlled with a sweeping control that may select from a number of different resistor selections. In some embodiments, the programmable resistors may include 30 different resistor selections. In other embodiments, the programmable resistors may include more or less resistor selections, such as two, four, eight, ten, 15, 20, 40, 50, or any suitable number greater than, less than, or between those listed. The sweeping control which selects different resistor selections may digitally control the programmable resistors according to the gain profiles 420 or 425 depending on which preamps 518 are being controlled. In some embodiments, two programmable resistors may be implemented in the probe 110. Each programmable resistor may control several of the preamps 518. In other embodiments, additional programmable resistors may be implemented.

At a summation component 530, signals received from the inner transducer elements 305b via the conductor 392 and the outer elements 305a via the conductor 391 are combined in an analog fashion and transmitted to the aperture translation MUX 540. Signals from the inner elements 305b via the conductor 394 and the outer elements 305a via the conductor 393 are similarly combined with a summation component 530 as well, as shown in FIG. 5. The summation components 530 may additionally be an analog adder circuit, summing mixer, or any suitable electronic component for summing signals.

The aperture translation MUX 540 shown in FIG. 5 may shift the aperture in the lateral/azimuth dimension as shown by the axis 399 in FIG. 3 along the transducer array 112 by switching between different positions. The aperture translation MUX 540 may additionally be referred to as a switch. For example, as discussed previously, in some embodiments, half (or any other suitable fraction, arrangement, or configuration) of the transducers 305 of the transducer array 112 may be used to transmit and receive ultrasound imaging signals into an anatomy thus forming the aperture of the transducer array 112. As the conductors 392 and 391 provide signals to and from the transducer column 301a and the conductors 394 and 393 provide signals to and from the transducer column 301m, the aperture translation MUX 540 shown in FIG. 5 may switch between these two columns, column 301a and column 301m. In this way, either column 301a or column 301m is engaged at once. Referring back to FIG. 3, the ultrasound imaging system 100 may define the aperture 332 as transducer columns 301a through 301l. In such a configuration, the aperture translation MUX 540 within the analog processor 310 in communication with column 301a and 301m would be switched to engage column 301a and not 301m. Similarly, the aperture translation MUX 540 in communication with columns 301b and 301n would be switched to engage column 301b, and not column 301n, and so on. Lastly, the aperture translation MUX 540 in communication with column 3011 and 301z would be switched to engage column 3011, and not 301z. If the ultrasound imaging system 100 were to shift the aperture to the right (aperture 334) by one transducer element 305, the only change necessary would be for the aperture translation MUX 540 in communication with column 301a and 301m to switch to engage column 301m. Similarly, for the ultrasound imaging system 100 to move the aperture to the aperture 336, each aperture translation MUX 540 would switch to engage the other column 301. In this manner, the aperture can be shifted to any suitable location using any suitable transducer columns 301 within the transducer array 112. Imaging data from each aperture in the azimuthal or lateral direction can be used to form one or more A-lines of a B-mode image. The A-lines generated from data obtained by multiple apertures can be combined to generate a B-mode image.

The output of the aperture translation MUX 540 shown in FIG. 5 is in communication with an ADC 520. The ADC 520 may be configured to convert analog ultrasound echo signals into digital ultrasound echo signals. For example, the ADC 520 may receive analog ultrasound echo signals generated by a given aperture of the transducer array 112, transmitted to the preamps 518 via the T/R switches 514 and convert them into digital ultrasound echo signals. Digital ultrasound echo signals may include digital samples representing the waveforms of corresponding analog ultrasound echo signals. The ADC 520 may employ a successive approximation ADC architecture to provide high-performance and lower-power consumption, and thus may keep total power dissipation of the probe 110 to be within a thermal budget of the probe 110. However, any suitable ADC architecture may be used for the ADC 520.

Numeral 340, shown in FIG. 5 was mentioned previously with reference to FIG. 3, and represents the bitrate of the ADC 520 and more generally the bitrate of the output of the analog circuitry 310. Groups of components shown in FIG. 5 may together be referred to as signal paths, signal pathways, electrical paths, electrical pathways, or any other suitable terms. For example, the conductor 392 in communication with a T/R switch 514, and a preamp 518 may be referred to as a signal path, or an inner element signal path. Any other groupings of components within FIG. 5 may additionally be referred to as signal paths and are also contemplated.

Figure 6:
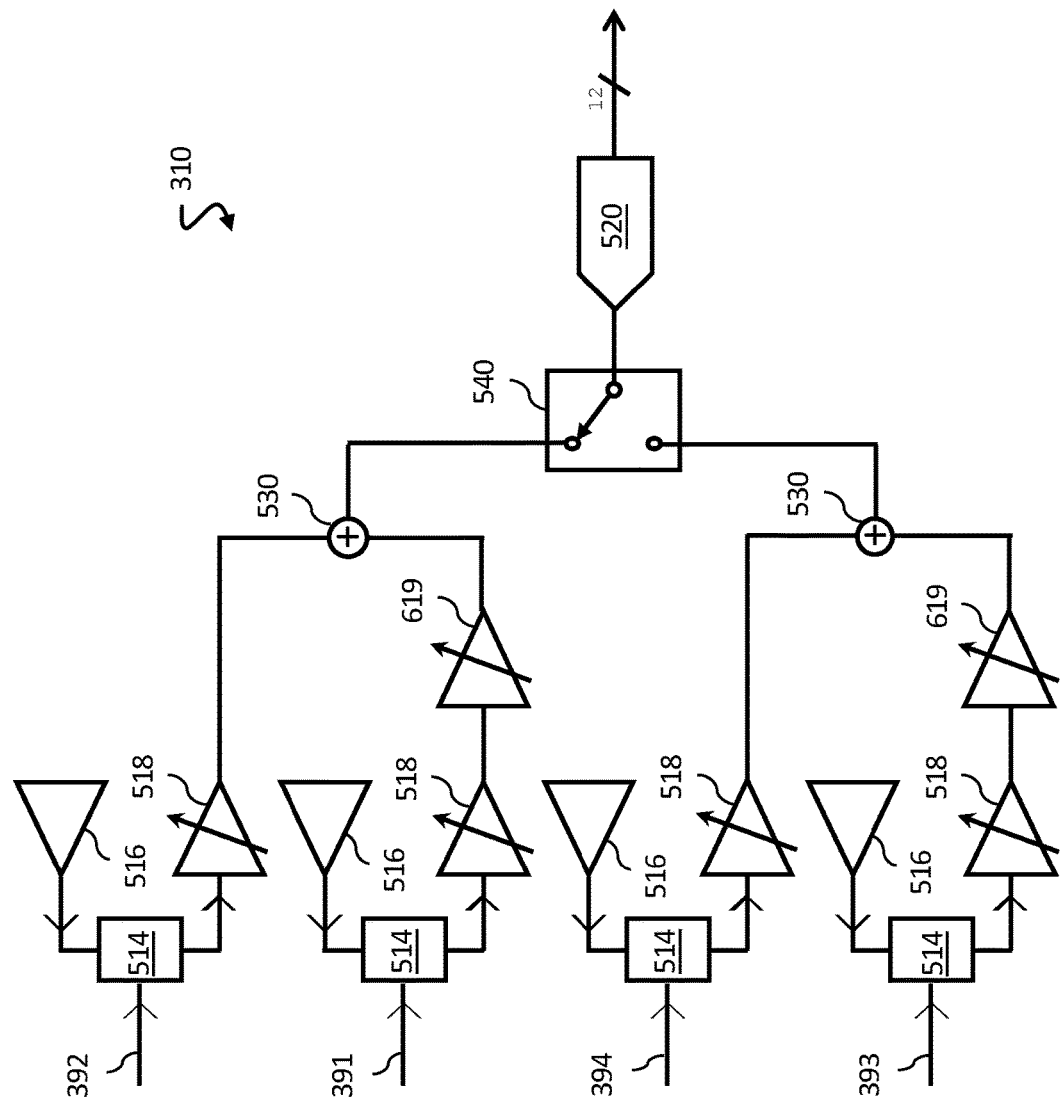
FIG. 6 is a schematic diagram illustrating example circuitry in communication with the transducer array, according to aspects of the present disclosure.

FIG. 6 is a schematic diagram illustrating example circuitry in communication with the transducer array 112, according to aspects of the present disclosure. FIG. 6 illustrates an additional embodiment of the present disclosure. All of the components shown in FIG. 6 may be substantially similar to those depicted in FIG. 5. However, the circuit 310 shown in FIG. 6 may additionally include a weight component 619. In that regard, the weight component 619 is an additional amplifier in the signal path of the analog ultrasound signals from the outer elements 305a of the transducer array 112. Accordingly, the weight component 619 can be referred to as a weight amplifier. Groups of components shown in FIG. 6 may similarly be referred to as signal paths, signal pathways, electrical paths, electrical pathways, or any other suitable terms.

The weight component 619 may be in communication with the output of the preamps 518 which are in communication with the outer elements 305a via the conductors 391 and 393. The embodiment illustrated in FIG. 6 may correspond to the gain profile 430. Specifically, in the embodiment shown in FIG. 6, a common gain profile may be applied to the preamps 518 for both the inner elements 305b and the outer elements 305a, as previously mentioned. In some of these embodiments, all the preamps 518 may be in communication with a common programmable resistor. The programmable resistor may be very similar to the programmable resistor described with reference to FIG. 5. For example, the programmable resistor may step through a series of resistor selections to implement a gain profile similar to the gain profiles disclosed in FIG. 4. The common gain profile may be similar to the gain profile 420 described with reference to FIG. 4. The weight component 619 may then apply an additional gain profile, similar to the gain profile 430 described with reference to FIG. 4, to the signals received from the outer transducer elements 305a via the conductors 391 and 393. As previously described, the gain profile 430 may additionally be referred to as a weighting profile and is selectively applied to the electrical signals generated by the outer elements 305a so that the effect of these electrical signals changes based on the profile 430. This selective application is accomplished by the positioning of the weight components 619 only in signal paths in communication with the outer elements 305a. In some embodiments, the weight component 619 may also be a programmable resistor with a set of resistor selections that can implement the gain profile or weighting profile 430 of FIG. 4 in a similar way. However, the programmable resistor implemented to control the weight component 619 may include far fewer resistor selections than the programmable resistor implementing a common gain profile for all preamps 518. In this way, the outer elements 305a may still be gradually engaged to widen the elevational width of the aperture, but fewer components are needed. The result is a simpler, less expensive, and more compact circuitry within the probe 110. It is also noted that any suitable method of implementing gain profiles 420, 425, and/or 430, or any other suitable gain profile may be used within the circuits 310. In some embodiments, the weight component 619 may be a variable gain amplifier which further acts on the signals received from the outer elements 305a previously acted on by the preamp 518 according to an additional gain profile similar to the gain profile 430 of FIG. 4. The variable gain amplifier 619 can be configured to amplify or attenuate the input signals.

Figure 7:
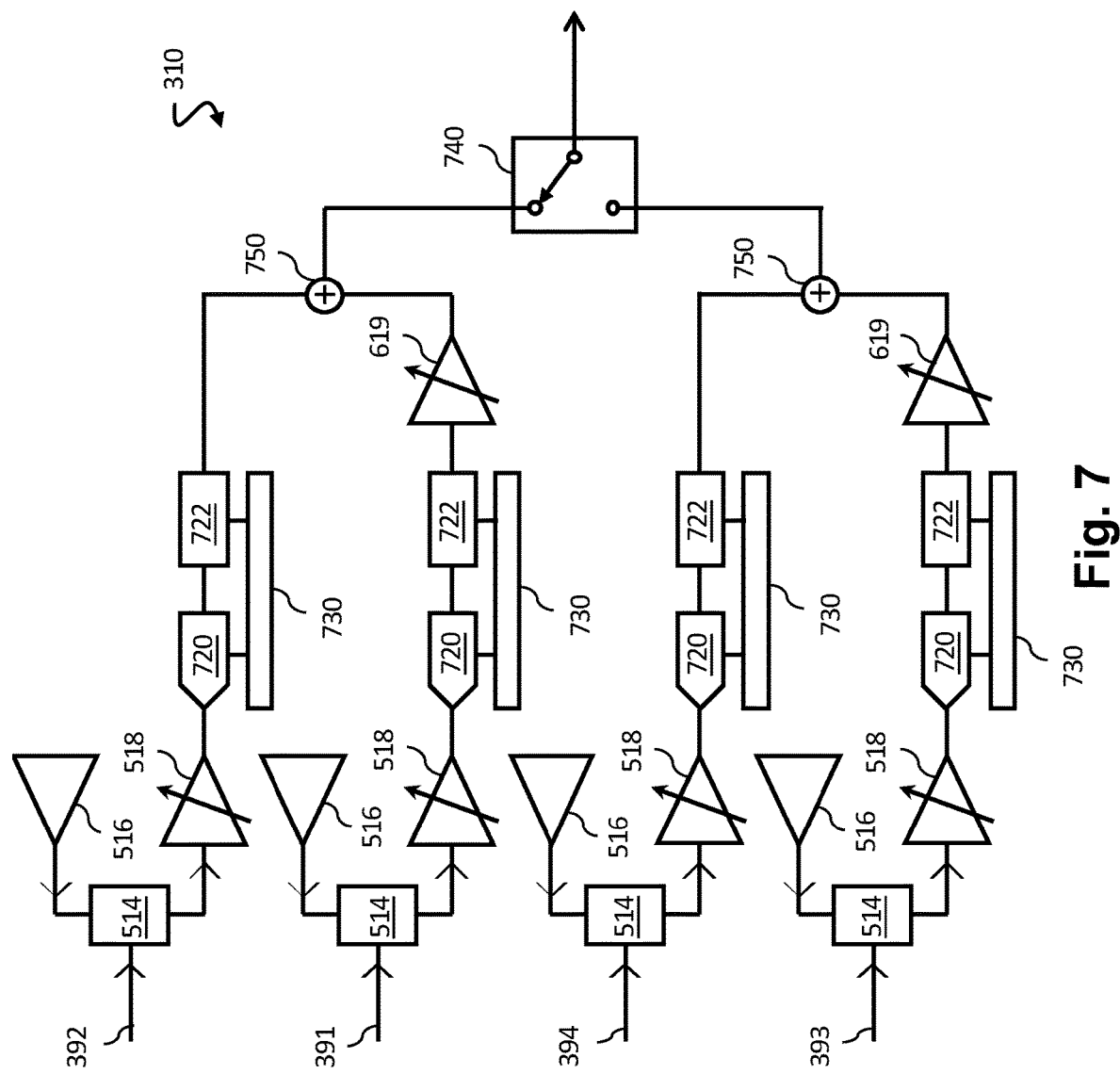
FIG. 7 is a schematic diagram illustrating example circuitry in communication with the transducer array, according to aspects of the present disclosure.

FIG. 7 is a schematic diagram illustrating example circuitry in communication with the transducer array 112, according to aspects of the present disclosure. FIG. 7 illustrates an additional embodiment of the present disclosure. All of the components shown in FIG. 7 may be substantially similar to those depicted in FIG. 6 and/or FIG. 5. However, the circuit 310 shown in FIG. 7 may additionally include multiple ADCs 720, delay components 722, and ADC clock controls 730. Groups of components shown in FIG. 7 may similarly be referred to as signal paths, signal pathways, electrical paths, electrical pathways, or any other suitable terms. In addition, components positioned after the ADCs 720 in FIG. 7 may be digital implementations of the components of FIGS. 5 and 6. For example, the weighting component or amplifier 619 shown in FIG. 7 may be a digital weight component or amplifier.

In the embodiment shown in FIG. 7, analog signals received from the transducer array 112 may be converted to digital signals before the weighting profile 430 is applied by the weight components 619. An ADC 720 may be positioned in communication with the output of the preamps 518. Similar to the ADC 520 of FIG. 5 and FIG. 6, the ADCs 720 may be configured to convert analog ultrasound echo signals into digital ultrasound echo signals. The ADCs 720 may be substantially similar to the ADC 520 in that they may use a successive approximation ADC architecture or may be of any other suitable type of ADC. The ADCs 720 may have any of the characteristics or features of the ADC 520.

Delay components 722 may be in communication with the output of the ADC's 720. The delay components 722 may include hardware components, software components, or a combination of hardware and software components. A primary purpose of the delay components 722 may be to focus the ultrasound imaging beam to produce a narrower beam than can be achieved using aperture width control alone. This enhanced focus is achieved by delaying the signals so that they are time aligned to sum coherently. For example, the delay components 722 may apply a delay to signals received from the inner transducer elements 305b and/or the outer elements 305a to control the location of the focus of the ultrasound imaging beam in the elevation dimension. In an example, the delay components 722 may receive commands from the host 130 to delay the received signals from the outer elements 305a by a specified amount of time. The delay may correspond to a number of samples. In an example, the delay components 730 may receive ultrasound data from the ADC's 720 and transmit the data to the summation components 750 or the weighting components 619, depending on the signal path, after delaying the data by the amount of time of one sample. The delay components 722 may delay the data by any suitable number of samples. In an embodiment in which ultrasound echo signals from the outer elements 305a are delays, as the delay to outer elements 305a is increased the focus of the imaged data may move closer to the ultrasound transducer array 112 and vice versa. The delay components 722 may be implemented using memory elements or a shift register. Fine delay control can be achieved by adjusting the sampling phase of the ADC. In other embodiments, an additional purpose of the delay components 722 may be to perform beamforming to signals received from the transducer elements 305. The delay components 722 may therefore be used to apply delays to signals between transducer elements in either the elevational direction, or the azimuthal direction, or both. In some embodiments, beamforming in the azimuthal dimension may occur for partial sets of elements or sub-arrays such as element pairs. This partial beamforming may reduce the amount of data sent to the system. For example, beamforming pairs of elements halves the data sent to the system thereby halving the associated number of wires. As partial beamforming is performed on sets of more elements, the data sent to the system and associated wires is further decreased.

Additionally depicted in FIG. 7 is the ADC clock controls 730. The ADC clock controls 730 may additionally be referred to as delay clock controls, clocks, or any other suitable terms. The ADC clock controls 730 may be in communication with both the ADCs 720 and the delay components 722. The ADC clock control 730 may include various circuitry and may perform various functions. In some embodiments, the delay component 722 previously discussed may delay signals received from the ADC 720 by shifting digital samples received in time. The ADC clock control 730 may then provide fine control over delay times by allowing different sampling phases for the inner transducer elements 305b and/or the outer elements 305a. The control of the ADC clock control 730 may be either static for a fixed focus or dynamic for a variable focus with depth. Either fixed or dynamic focusing may be implemented in either the elevational or azimuthal direction. The ADC clock control 730 and its communication with and control of the ADCs 720 and delay components 722 may include some features similar to those described in U.S. application Ser. No. 16/329,433, titled "ULTRASOUND PROBE WITH MULTILINE DIGITAL MICROBEAMFORMER," and filed Feb. 28, 2019 and/or U.S. Provisional Application No. 62/631,549, titled "DIGITAL ULTRASOUND CABLE AND ASSOCIATED DEVICES, SYSTEMS, AND METHODS," and filed Feb. 16, 2018, both of which are hereby incorporated by reference in their entirety. Later in the signal path of the analog processor 310 shown in FIG. 7 are summation components 750 and an aperture translation MUX 740. The summation components 750 may be substantially similar to the summation components 530 of FIG. 5 and FIG. 6. However, due to the analog to digital conversion performed by the ADCs 720 in the embodiment disclosed in FIG. 7, the summation components 750 combine the signals from inner elements 305b and the outer elements 305a in a digital manner. Similarly, the aperture translation MUX 740 may perform substantially the same purpose as the aperture translation MUX 540 of FIG. 5 and FIG. 6, however, it may be implemented digitally. The summation components 750 may additionally include a digital adder circuit, summing mixer, or any suitable hardware components, software components, or combinations of hardware and software components for summing signals.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

The invention claimed is:

1. An ultrasound imaging system, comprising:
an ultrasound probe, comprising:
a housing;
a transducer array mechanically coupled to the housing, wherein the transducer array comprises a first acoustic element, a second acoustic element, and a third acoustic element, wherein the first acoustic element is arranged between the second acoustic element and the third acoustic element in an elevation dimension, wherein the first acoustic element is configured to generate a first analog ultrasound signal, and the second acoustic element and the third acoustic element are electrically coupled to generate a second analog ultrasound signal;
a first amplifier disposed within the housing and in communication with the first acoustic element; and
a second amplifier and a third amplifier disposed within the housing and in communication with the second acoustic element and the third acoustic element,
wherein the first amplifier and the second amplifier are configured to apply gain to the first analog ultrasound signal and the second analog ultrasound signal, respectively, according to a first gain profile, and wherein the third amplifier is configured to apply gain only to the second analog ultrasound signal according to a second gain profile that is different than the first gain profile.

2. The system of claim 1, wherein the transducer array comprises a 1.X-dimensional array.

3. The system of claim 2,
wherein the transducer array comprises a first row of acoustic elements, a second row of acoustic elements, and a third row of acoustic elements,
wherein the first row of acoustic elements is arranged between the second row of acoustic elements and the third row of acoustic elements in the elevation dimension, and
wherein the first row of acoustic elements comprises the first acoustic element, the second row of acoustic elements comprises the second acoustic element, and the third row of acoustic elements comprises the third acoustic element.

4. The system of claim 1, wherein the ultrasound probe further comprises:
a first analog summation circuit in communication with the first amplifier and the third amplifier, wherein the first analog summation circuit is configured to combine the first analog ultrasound signal and the second analog ultrasound signal to generate a first analog output.

5. The system of claim 4,
wherein the ultrasound probe further comprises circuitry in communication with the first acoustic element, the second acoustic element, and the third acoustic element,
wherein the circuitry comprises the first amplifier, the second amplifier, and the third amplifier,
wherein the circuitry is in communication with a fourth acoustic element, a fifth acoustic element, and a sixth acoustic element,
wherein the fourth acoustic element is arranged between the fifth acoustic element and the sixth acoustic element in the elevation dimension,
wherein the first acoustic element, the second acoustic element, and the third acoustic element are arranged in a first column of the transducer array,
wherein the fourth acoustic element, the fifth acoustic element, and the sixth acoustic element are arranged in a second column of the transducer array, and
wherein the first column and the second column are spaced from one another in an azimuth dimension such that other columns of the transducer array are disposed between the first column and the second column.

6. The system of claim 5, wherein the ultrasound probe further comprises:
a fourth amplifier disposed within the housing and in communication with the fourth acoustic element;
a fifth amplifier and a sixth amplifier disposed within the housing and in communication with the fifth acoustic element and the sixth acoustic element; and
a second analog summation circuit in communication with the fourth amplifier and the sixth amplifier,
wherein the fourth acoustic element is configured to generate a third analog ultrasound signal, and the fifth acoustic element and the sixth acoustic element are electrically coupled to generate a fourth analog ultrasound signal,
wherein the fourth amplifier and the fifth amplifier are configured to apply gain to the third analog ultrasound signal and the fourth analog ultrasound signal, respectively, according to the first gain profile,
wherein the sixth amplifier is configured to apply gain only to the fourth analog ultrasound signal according to the second gain profile, and
wherein the second analog summation circuit is configured to combine the third analog ultrasound signal and the fourth analog ultrasound signal to generate a second analog output.

7. The system of claim 6, wherein the ultrasound probe further comprises a multiplexor configured to translate an aperture of the transducer array in the azimuth dimension.

8. The system of claim 7, wherein the multiplexor is configured to select between the first analog output and the second analog output.

9. The system of claim 4, wherein the ultrasound probe further comprises:
an analog-to-digital converter (ADC) in communication with the analog summation circuit, wherein the ADC is configured to receive the output of the analog summation circuit and to generate a digital ultrasound signal.

10. The system of claim 9, further comprising a host system spaced from the ultrasound probe and a cable extending between the host system and the ultrasound probe,
wherein the ultrasound probe is configured to transmit the digital ultrasound signal to the host system via the cable, and
wherein the host system comprises a processor circuit configured to generate an ultrasound image based on the digital ultrasound signal and output the ultrasound image to a display in communication with the processor circuit.

11. The system of claim 1, wherein the third amplifier is configured to increase an elevation size of an aperture of the transducer array.

12. An ultrasound imaging system, comprising:
an ultrasound probe, comprising:
a housing;
a transducer array mechanically coupled to the housing, wherein the transducer array comprises a first acoustic element, a second acoustic element, and a third acoustic element, wherein the first acoustic element is arranged between the second acoustic element and the third acoustic element in an elevation dimension, wherein the first acoustic element is configured to generate a first analog ultrasound signal, and the second acoustic element and the third acoustic element are electrically coupled to generate a second analog ultrasound signal;
a first amplifier disposed within the housing and in communication with the first acoustic element; and
a second amplifier and a third amplifier disposed within the housing and in communication with the second acoustic element and the third acoustic element,
wherein the first amplifier and the second amplifier are configured to apply gain to the first analog ultrasound signal and the second analog ultrasound signal, respectively, according to a first gain profile, and
wherein the third amplifier is configured to apply gain only to the second analog ultrasound signal according to a second gain profile that is different than the first gain profile,
wherein the ultrasound probe further comprises:
a digital adder;
a first analog to digital converter (ADC) communicatively positioned between the first amplifier and the digital adder; and
a second ADC communicatively positioned between the second amplifier and the digital adder.

13. The system of claim 12, wherein the third amplifier comprises a digital amplifier communicatively positioned between the second ADC and the digital adder.

14. The system of claim 13, wherein the ultrasound probe further comprises:
   a first digital delay communicatively positioned between the first ADC and the digital adder; and
   a second digital delay communicatively positioned between the second ADC and the third amplifier.

15. The system of claim 14, wherein the ultrasound probe further comprises:
   a first clock control in communication with the first ADC and the first digital delay; and
   a second clock control in communication with the second ADC and the second digital delay.

16. An ultrasound imaging probe, comprising:
   a housing;
   a 1.X-dimensional transducer array mechanically coupled to the housing, wherein the transducer array comprises a first row of acoustic elements, a second row of acoustic elements, and a third row of acoustic elements, wherein the first row of acoustic elements is arranged between the second row of acoustic elements and the third row of acoustic elements in an elevation dimension, wherein the second row of acoustic elements and the third row of acoustic elements are electrical coupled;
   a first amplifier, a second amplifier, and a third amplifier disposed within the housing; and
   an analog to digital converter (ADC) configured to generate a digital ultrasound signal such that the ultrasound imaging probe outputs the digital ultrasound signal,
   wherein the first amplifier is configured to apply gain to a first analog ultrasound signal associated with the first row of acoustic elements according to a first gain profile,
   wherein the second amplifier is configured to apply gain to a second analog ultrasound signal associated with the second row of acoustic elements and the third row of acoustic elements according to the first gain profile,
   wherein the third amplifier is configured to apply gain to only the second analog ultrasound signal according to a second gain profile different than the first gain profile such that an elevation size of an aperture of the transducer array increases, and
   wherein the ADC is configured to generate the digital ultrasound signal based on at least one of the first analog ultrasound signal or the second analog ultrasound signal.

\* \* \* \* \*